United States Patent [19]
Hunt et al.

[11] Patent Number: 4,499,893
[45] Date of Patent: Feb. 19, 1985

[54] SOLAR HEAT RECEIVER

[75] Inventors: Arlon J. Hunt, Oakland; Leif J. Hansen, Berkeley; David B. Evans, Orinda, all of Calif.

[73] Assignee: The United States of America as represented by the United States Department of Energy, Washington, D.C.

[21] Appl. No.: 426,370

[22] Filed: Sep. 29, 1982

[51] Int. Cl.³ .............................................. F24J 3/02
[52] U.S. Cl. .................................. 126/449; 126/450
[58] Field of Search ............. 126/450, 901, 438, 439, 126/451, 449; 60/641.12, 641.15; 165/81, 82

[56] References Cited

U.S. PATENT DOCUMENTS 2,468,903  5/1949  Villiger ................................ 165/81
4,121,564  10/1978  Schwartz ........................... 126/438
4,220,140  9/1980  Francia .............................. 126/438

FOREIGN PATENT DOCUMENTS 374525  4/1923  Fed. Rep. of Germany ...... 126/438

OTHER PUBLICATIONS

P. Jarvinen, Ceramic Solar Receivers, Aug. 1979, pp. 26–31.

Primary Examiner—Samuel Scott
Assistant Examiner—G. Anderson
Attorney, Agent, or Firm—L. E. Carnahan; Roger S. Gaither

[57] ABSTRACT

A receiver for converting solar energy to heat a gas to temperatures from 700°–900° C. The receiver is formed to minimize impingement of radiation on the walls and to provide maximum heating at and near the entry of the gas exit. Also, the receiver is formed to provide controlled movement of the gas to be heated to minimize wall temperatures. The receiver is designed for use with gas containing fine heat absorbing particles, such as carbon particles.

16 Claims, 2 Drawing Figures

SOLAR HEAT RECEIVER

BACKGROUND OF THE INVENTION

The invention described herein arose under work at Lawrence Berkeley Laboratory in the course of, or under, contract DE-AC03-76SF00098 (formerly W-7405-ENG-48) between the U.S. Department of Energy and the University of California.

The invention relates to apparatus for collecting radiant energy and converting same into an alternate energy form, particularly to an apparatus for collecting solar radiant energy by having same absorbed by small particles disbursed in a fluid stream, and more particularly to an improved receiver for utilizing or transferring solar energy to heat a gas.

Concentrated sunlight provides an intense source of radiant energy that offers an alternative to fossil fuels for operating heat engines, providing high temperature industrial heat, and for directly processing fuels and chemicals. Because sunlight originates from a radiating body at a considerably higher temperature than other familiar energy sources, solar radiation has quite different characteristics from those sources with which we gained our power conversion experience over the past 150 years.

Various prior approaches have been developed for utilization of solar radiation. These prior approaches have utilized different types of reflector and/or receiver apparatus for utilizing solar energy. These prior efforts are exemplified by U.S. Pat. No. 1,951,403 issued Mar. 20, 1934 to R. H. Goddard; U.S. Pat. No. 3,908,632 issued Sept. 30, 1975 to H. W. Poulsen; U.S. Pat. No. 3,998,206 issued Dec. 21, 1976 to A. Jahn, and U.S. Pat. No. 4,116,222 issued Sept. 26, 1978 to W. Seifriend. In addition, various types of materials, such as ceramics, have been utilized in solar receivers to incerease the efficiency thereof, as illustrated by an American Chemical Society article entitled "Ceramic Solar Receivers", by P. O. Jarvinen, August 1979.

More recently, a radiant energy collection and conversion apparatus has been developed in which the principal of operation differs from other solar energy conversion apparatus in that the solar-to-thermal conversion is accomplished by a dispersion of submicron particles suspended in a gas or working fluid to absorb radiant energy directly from concentrated sunlight. Such an apparatus is described and claimed in U.S. Pat. No. 4,313,304 issued Feb. 2, 1982 to A. J. Hunt.

While the apparatus and method of U.S. Pat. No. 4,313,304 has been shown to provide an effective conversion system, a need has existed for a more efficient receiver for directing the solar radiation onto the solar absorbing particle containing gas or other working fluid flowing through the receiver for heating same.

SUMMARY OF THE INVENTION

The present invention provides an improved solar heat receiver for more effectively converting solar energy to heat a gas or other working medium. The receiver of this invention is particularly adapted for heating a working medium such as a gas flowing through the receiver and in which is suspended submicron heat absorbing particles, such as carbon, which absorb the sunlight and act as very efficient heat exchangers to transfer the heat to the gas. The small heat absorbing particles continue to heat until they react chemically with the gas or vaporize.

Therefore, it is an object of this invention to provide a solar heated receiver.

A further object of the invention is to provide a receiver for converting solar energy to heat a gas or other working medium.

Another object of the invention is to provide a solar energy receiver which minimizes impingement of radiation on the walls of the receiver and provides maximum heating at and near the entry of an exit into which a gas to be heated passes.

Another object of the invention is to provide a solar thermal receiver which is designed for use with a gas containing fine energy absorbing particles which act as heat exchangers to heat the gas.

Other objects of the invention will become readily apparent to those skilled in the art in view of the accompanying drawings and following description.

The above objects of this invention are carried out by an improved solar thermal receiver placed at the focus of a central tower or parabolic dish concentrator system. The receiver, which confines the gas-particle mixture, includes a window through which the solar energy is directed, the window functioning to reduce the amount of infrared reradiation leaving the receiver, and because the window is at a lower temperature than the working medium, produce a high overall efficiency of the receiver.

More specifically the solar heat receiver of this invention uses a gas containing fine carbon particles and which is capable of providing temperatures of 700° to 900° C. The receiver comprises a receiving chamber having cylindrical side walls, an inverted frusto-conical lower section having a window in its opening, a roof formed from an outer frusto-conical section and an inner inverted frusto-conical section, a manifold chamber formed around the cylindrical side walls, means to direct a gas containing fine particulate carbon into said manifold chamber in circular motion therein, walls forming openings between the manifold chamber and the interior of the receiver for directing the gas and particulate in cyclone fashion within the chamber, and a quartz tube extending through the top of the container in sealed relation with the inner conical section of the roof for directing heated gas from the receiver, said quartz tube having its lower end spaced from but close to the window. The receiver is used with a concentrating mirror system which directs solar radiation through a focal plane near the window and into the receiver. The system is designed to allow for the outer walls to be considerably cooler than the heated gas by the special shape of the container and the cyclonic gas flow.

DETAILED DESCRIPTION OF THE INVENTION

Figure 1:
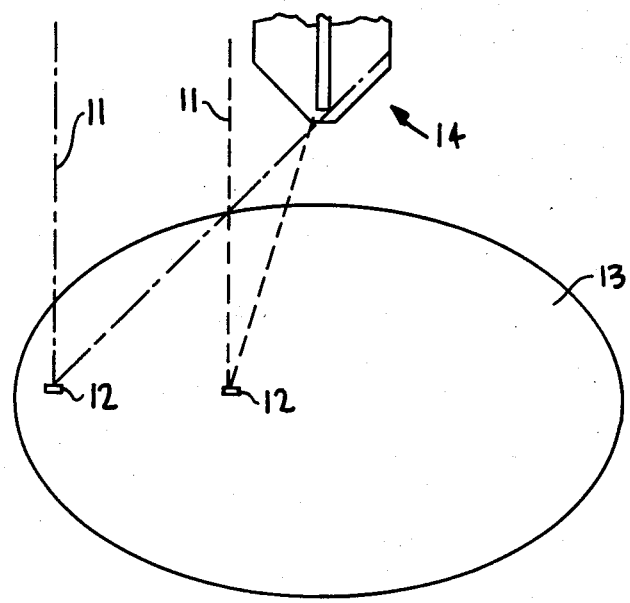
FIG. 1 illustrates a receiver made in accordance with the invention in a system for optically concentrating solar energy into the receiver.

The invention is a component of a system, such as in above-referenced U.S. Pat. No. 4,313,304, which operates by injecting a very small mass of ultrafine carbon particles into a gas stream and exposing the suspension to sunlight that is focused through a window of the component. The particles absorb the sunlight and act as very efficient heat exchangers to transfer the heat to the gas. The particles are very small and, therefore, not significantly affected by gravitational or inertial forces, and thus are effectively part of the gas. The particles continue to heat until they react chemically with the gas or vaporize. For gases containing oxygen, the maximum output temperature is determined by the oxidation rate of the carbon particles. The particles are used in a once-through mode because of the very low requirement for carbon and since they may be generated on site. For example, the generator for the carbon particles may be of the type described and claimed in copending U.S. patent application Ser. No. 426,369, filed Sept. 29, 1982, now U.S. Pat. No. 4,452,771 issued Jun. 5, 1984, entitled Carbon Particle Generator, and assigned to the assignee of this application.

The receiver provides high temperature gas to operate a gas turbine or for use in industrial process heat applications, as well as being suitable for a wide range of powers and a variety of applications. The window in the receiver reduces the amount of infrared re-radiation leaving the receiver, and because the window is at a lower temperature than the working medium, it provides a high overall efficiency.

Since the receiver uses small particles which act as heat exchanger elements, there is no need for heavy and complex heat exchanger elements, the receiver consists basically of a hollow chamber with a window, resulting in a light weight structure. Because of the heat exchanger effect of the carbon particles, the heat exchanger function is distributed throughout the chamber, it is not necessary to pump the gas through long tubes, which has the effect of considerably reducing the amount of energy required to overcome pressure losses.

The receiver is designed to heat ambiant air to 700°-900° C. and is constructed such that more than 90% of the radiant energy entering the receiver is absorbed directly in the gas particle suspension. The receiver basically consists of a receiving chamber having cylindrical side walls and an inverted frusto-conical lower section having a window in its opening, the receiving chamber being an open volume in which the sunlight is absorbed, a gas injection system and a gas exhaust system. The receiver is designed to produce a significant cyclone motion to smooth out the effects of non-uniform solar flux density and to organize the internal flow. One unique aspect of the receiver is the use of a transparent tube that penetrates the high flux region, acts as an exhaust port, and insures that the gas particle suspension or mixture passes through the maximum flux density region before leaving the receiver.

Referring now to the drawing, the solar heat receiver is positioned in a solar energy concentration system, as shown in FIG. 1, such that solar rays 11 are reflected by mirror elements 12, of a concentrating mirror assembly or field 13 containing numerous mirror elements 12 positioned thereabout, and are directed through a focal plane and into solar heat receiver 14.

Figure 2:
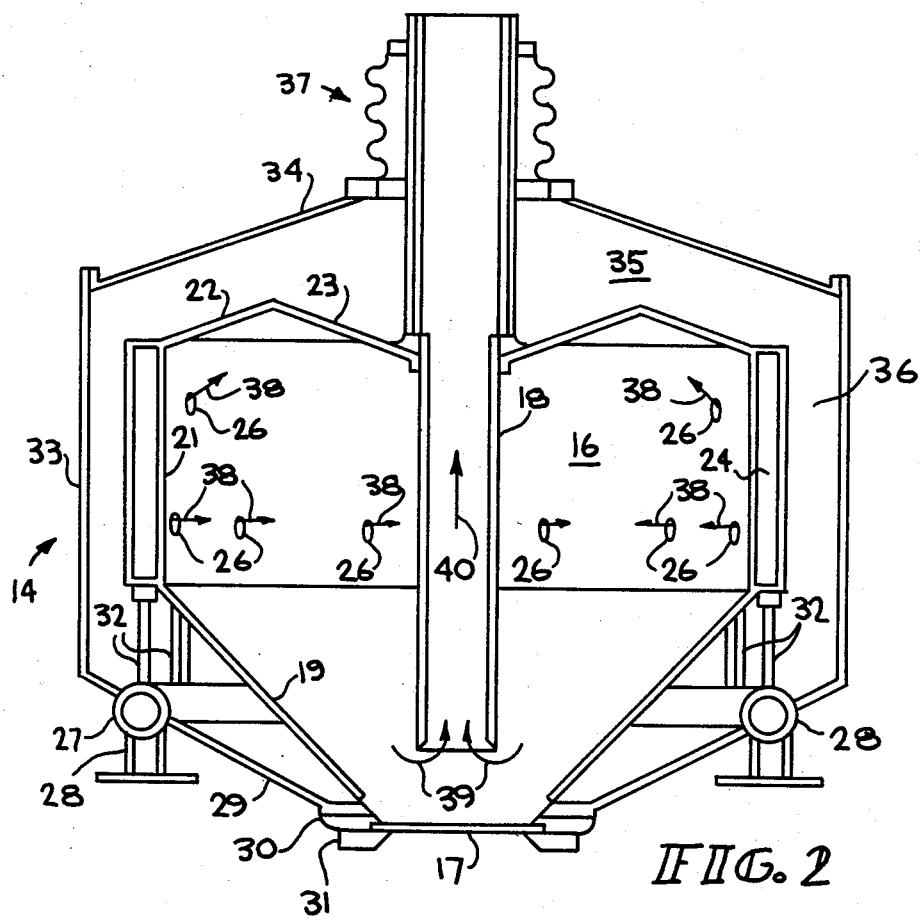
FIG. 2 is a cross-sectional view of an embodiment of the solar thermal receiver of the invention.

As shown in FIG. 2, the receiver 14 comprises a housing defining an inner chamber 16 having a quartz window 17 at its lower end, and a transparent quartz outlet or gas exhaust tube 18 having an opening near the window and extending upwards through the top of chamber 16. Chamber 16 is formed in a special geometric configuration in order to minimize wall temperatures. Thus, the housing defining the chamber 16 comprises a lower section or wall 19 in the shape of an inverted frusto-conical surface, a generally cylindrical section or side wall 21 adjacent to the lower wall, and a roof section composed of frusto-conical walls or members 22 and 23. Wall 19 is inclined to fit the travel of radiation reflected from the outer portion of the mirror system 13, and is typically about 45 degrees from the vertical, but may have an angle of 20 to 60 degrees. With this configuration, reflected solar radiation first passes through a focal plane, through the window 17, and then impinges on carbon particles suspended in the gas or other working medium in the chamber 16.

In this way, minimal radiation strikes lower wall 19, and it is mostly absorbed before it reaches either the side wall 21 or roof walls 22 and 23. By making quartz tube 18 transparent, solar radiation can also pass through the tube and heat the gas inside. From the drawing, it is seen that the position of maximum heating is just above the window 17 and that the gases are at maximum temperature as they pass through the first part of the exit or exhaust tube. At this location, the carbon particles will be vaporized or will chemically react with the gas when such particles are used, and further increase the temperature of the gas mixture.

The walls of chamber 16 are not only formed to receive minimal energy, but also the chamber is constructed to be cooled by the entry gas or working medium. To that end, a manifold chamber 24 is formed around wall 21, and incoming gas is delivered into the chamber tangentially, by a delivery system not shown, to provide rotation of the gas in manifold chamber 24. The delivery system is described in report LBL-13755 entitled "The Design and Construction of a High Temperature Gas Receiver Utilizing Small Particles as the Heat Exchanger (SPHER)" by A. J. Hunt and D. B. Evans, September 1982, Lawrence Berkeley Laboratory, University of Calif. The gas circling in manifold chamber 24 is directed into chamber 16 through ports or nozzle openings 26. The gas is supplied to manifold chamber 24 by a plurality of nozzles (not shown). The nozzle construction is also described in the above-referenced report LBL-13755.

Chamber 16 is also specially constructed to allow for expansion. The entire unit is supported from support ring 27, which in turn is carried on a plurality of legs 28 that may be supported further as required. Depending from the support ring 27 is a conical outer member sheet 29 which is secured to inner window ring or member 30 on its outer periphery and fitted but not secured to wall 19 of chamber 16 on its inner periphery. Ring 30 is formed to receive window assembly 17, which is formed by two window clamp rings or members 31 secured to ring 30 with suitable bolts (not shown). Chamber 16 is supported by a plurality of flat springs 32 compressed between the lower surface of manifold chamber 24 and support ring 27. This allows for free and concentric expansion of the chamber. Quartz tube 18 is sealably secured in roof section 23 and it is free to move also when the chamber is expanded.

As shown in the drawing, receiver 14 also comprises an outer casing or housing forming an outer chamber 35 spaced from the inner chamber 16 to provide an insulation space 36 for chamber 16. The space 36 is filled with high temperature insulating material. The outer chamber 35 is formed by lower wall 29, a cylindrical side wall 33, and an outer roof 34. Roof 34 is formed with a stack assembly 37 through which quartz outlet tube passes. This stack contains a gas seal and bellows assembly which is more fully described in above-referenced report LBL-13755 and which allows for movement of said tube 18 upon expansion of chamber 16.

In operation, gas containing fine carbon particles, for example having 0.01 to 0.5 micrometer diameters, from a particle generator, not shown but described in detail in report LBL-13755, is directed into manifold 24. Air is also supplied to the receiver by induction with the gas particle stream. The flow is directed into manifold 24 in swirling motion and thence through nozzle openings 26 into the inner chamber 16. The upper nozzle openings 26 are tilted upwards to provide upward movement as the incoming gas flows (indicated by arrows 38) and to cool the roof sections 22 and 23. The carbon particles in the gas pick up solar energy as the gas moves through the receiver and are greatly heated as the gas moves into exit tube 18 indicated by arrows 39. The heated gas will vaporize or chemically react with any carbon particles at the entry point or within the quartz tube, and the heated gas then flows toward the outlet as shown by arrow 40.

The salient features of the invention are summarized below:

(1) The transparent quartz tube is located to insure that the gas-particle mixture passes through the maximum flux density just before leaving the receiver.

(2) The chambers are constructed of low-cost materials made possible by keeping the chamber walls at minimal temperatures.

(3) Chamber walls are kept at minimal temperatures by using a geometric configuration that provides maximal impingement of solar radiation on the particle-gas mixture and minimal impingement on the walls of the chamber.

(4) Further cooling of the chamber walls is provided by moving the gas-particle mixture in cyclone type flow first through a manifold exterior of the radiation-receiving chamber and thence through the chamber with an upward swirl provided to move inlet gas past the roof area.

(5) The gas-particle mixture enters at ambient temperature and is heated to about 800° C., providing a volumetric expansion of a factor greater than 3, thereby accelerating the gas flow significantly. These factors make it important to provide for the variations in expansion and the relatively large exit tube.

(6) Special support and sealing structure is utilized to provide for thermal expansion.

It has thus been shown that the invention provides an improved solar thermal receiver, particularly adapted for a working medium having small heat absorbing particles suspended therein, which has the capability of converting solar energy to heat the medium to temperatures of 700°–900° C., while minimizing impingement of radiation on the walls of the receiver and providing maximum heating at and near the entry of the medium into an outlet conduit. Thus, the receiver of this invention has substantially improved the efficiency of solar heated receivers.

While a particular embodiment of the invention has been illustrated and described, modifications will become apparent to those skilled in the art, and it is intended to cover in the appended claims all such modifications as come within the scope of this invention.

What is claimed is:

1. A receiver for heating a gas by solar energy which minimizes impingement of radiation on the walls of the receiver and provides maximum heating at and near the entry of a passageway into which a gas to be heated passes, said receiver comprising:
a housing constructed to allow for expansion and defining a chamber therein, said housing having a lower section in the shape of an inverted frusto-conical surface having an opening therein, a generally cylindrical wall section, and a roof section composed of frusto-conical members;
a gas manifold postitioned around at least said cylindrical wall section of said housing;
means for directing gas to be heated from said manifold into said cylindrical wall section of said housing defining said chamber in a cyclone fashion;
a gas exhaust means positioned in said housing and having a gas entry located in said lower section of said housing and in open communication with said chamber; and
window means positioned in said lower section of said housing for admitting solar energy thereinto and at least onto said gas entry of said gas exhaust means;
whereby maximum heating is at and near said gas entry.

2. The receiver of claim 1, wherein said window is constructed of quartz and positioned adjacent said opening in said inverted frusto-conical surface.

3. The receiver of claim 2, wherein said inverted frusto-conical surface is inclined at an angle of about 20 to about 60 degrees from the vertical.

4. The receiver of claim 1, wherein gas exhaust means comprises a tube vertically positioned in movable sealed relation in said housing and having a lower end forming said gas entry located in a spaced relation to said window means.

5. The receiver of claim 4, wherein said tube is composed of quartz.

6. The receiver of claim 1, additionally including spring biased means for supporting said housing for allowing for free expansion of said chamber.

7. The receiver of claim 6, wherein said spring biased supporting means includes a support ring, a plurality of legs secured to said support ring, a conical shaped member secured to said window means, and a plurality of spring means positioned between said support ring and said gas manifold.

8. The receiver of claim 1, wherein said window means comprises a quartz window member positioned in a ring-shaped member and secured therein by a plurality of clamp means.

9. The receiver of claim 1, additionally including an outer casing positioned around said housing and defining a space therebetween containing insulating material, said outer casing comprising a cylindrical wall section, a conical shaped lower section, and a roof section.

10. The receiver of claim 9, additionally including a stack assembly positioned in said roof section of said outer casing through which said gas exhaust means extends, said stack assembly including a gas seal and bellows which allows for movement of said exhaust means with respect to said outer casing.

11. The receiver of claim 1 in combination with means for directing solar energy through said window into said chamber for heating gas directed into said chamber to temperatures of about 700°–900° C.

12. The receiver of claim 1, wherein said gas directed into said chamber is provided with submicron size heat absorbing particles suspended therein which function as heat exchangers for heating said gas by absorbing solar energy directed through said window means, said particles being composed of material which chemically reacts with or is vaporized in said gas when heated.

13. The receiver of claim 12, wherein said particles are composed essentially of carbon having diameters in the range of about 0.01 to 0.5 micrometers.

14. A receiver for heating a gas by solar energy, comprising:
- a housing constructed to allow for expansion and defining a chamber therein, said housing having a lower section in the shape of an inverted frusto-conical surface having an opening therein, a generally cylindrical wall section, and a roof section composed of frusto-conical members;
- a gas manifold positioned around at least said cylindrical wall section of said housing;
- means for directing gas to be heated from said manifold into said chamber in a cyclone fashion;
- a gas exhaust means positioned in said housing and having a gas entry adjacent said lower section of said housing;
- window means positioned in said lower section of said housing for admitting solar energy thereinto; and
- spring biased means for supporting said housing for allowing for free expansion of said chamber, said spring biased supporting means includes a support ring, a plurality of legs secured to said support ring, a conical shaped member secured to said window means, and a plurality of spring means positioned between said support ring and said gas manifold.

15. A receiver for heating a gas by solar energy, comprising:
- a housing constructed to allow for expansion and defining a chamber therein, said housing having a lower section in the shape of an inverted frusto-conical surface having an opening therein, a generally cylindrical wall section, and a roof section composed of frusto-conical members;
- a gas manifold positioned around at least said cylindrical wall section of said housing;
- means for directing gas to be heated from said manifold into said chamber in a cyclone fashion;
- a gas exhaust means positioned in said housing and having a gas entry adjacent said lower section of said housing; and
- window means positioned in said lower section of said housing for admitting solar energy thereinto;
- said gas directed into said chamber being provided with submicron size heat absorbing particles suspended therein which function as heat exchangers for heating said gas by absorbing solar energy directed through said window means, said particles being composed of material which chemically reacts with or is vaporized in said gas when heated.

16. The receiver of claim 15, wherein said particles are composed essentially of carbon having diameters in the range of about 0.01 to 0.5 micrometers.

* * * * *